Inventor
SIDNEY H. LIEBSON.

May 23, 1950
S. H. LIEBSON
2,508,408
AVERAGING INDICATOR
Filed Oct. 11, 1943
4 Sheets-Sheet 2
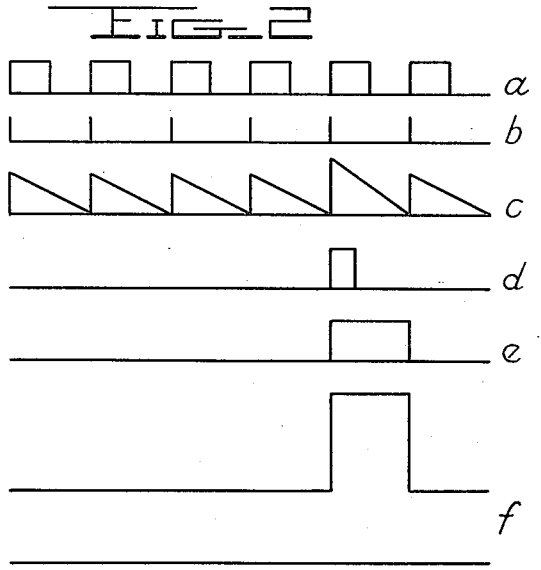
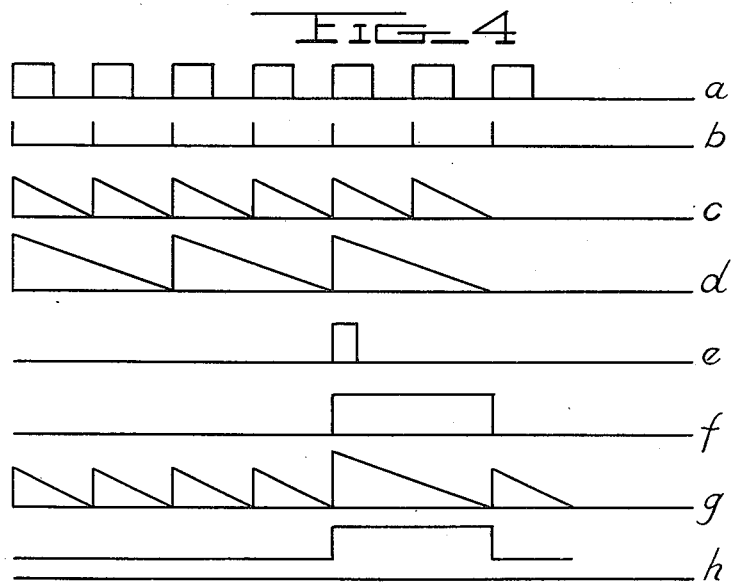
Inventor
SIDNEY H. LIEBSON.
By
Attorney

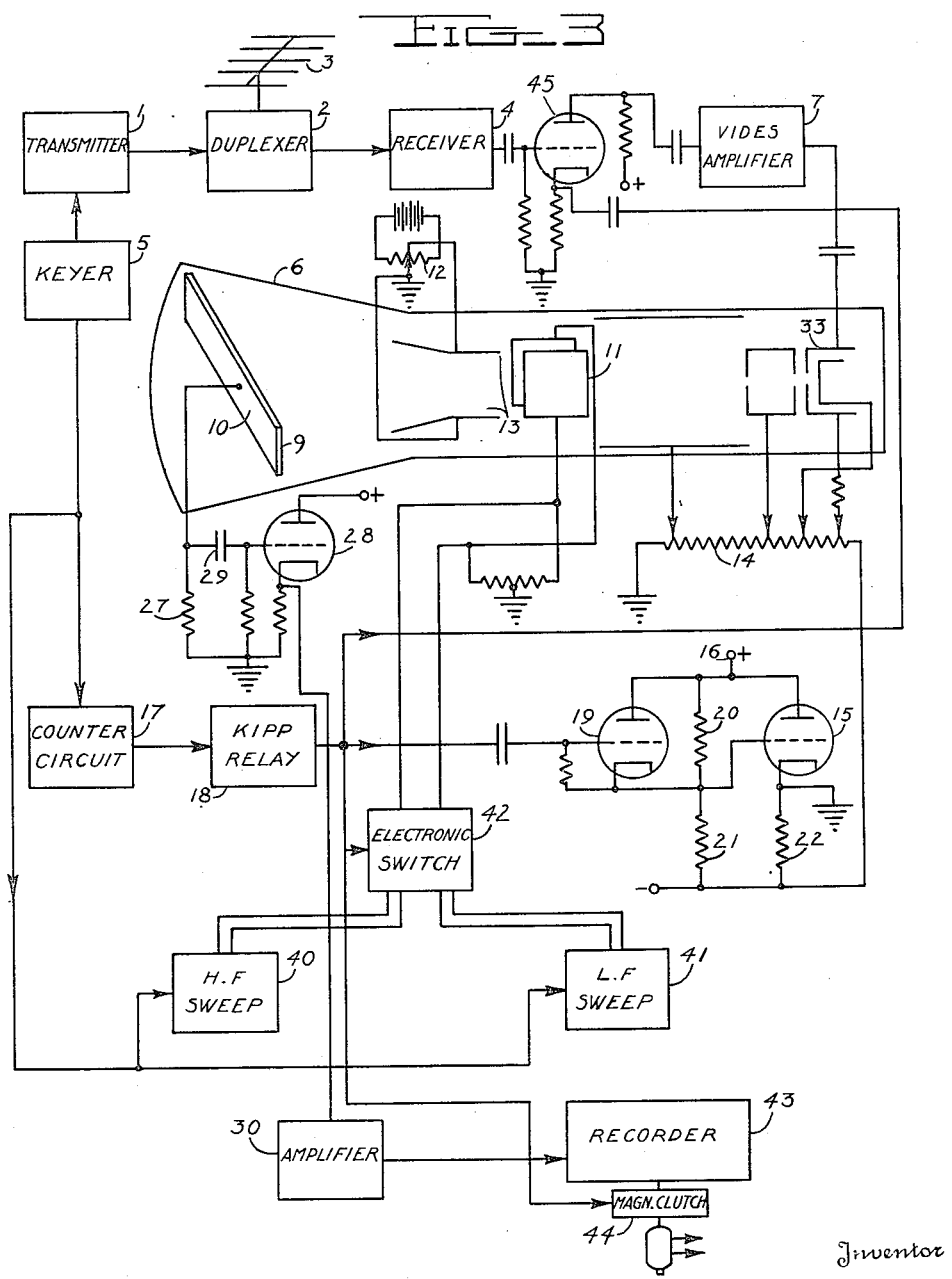

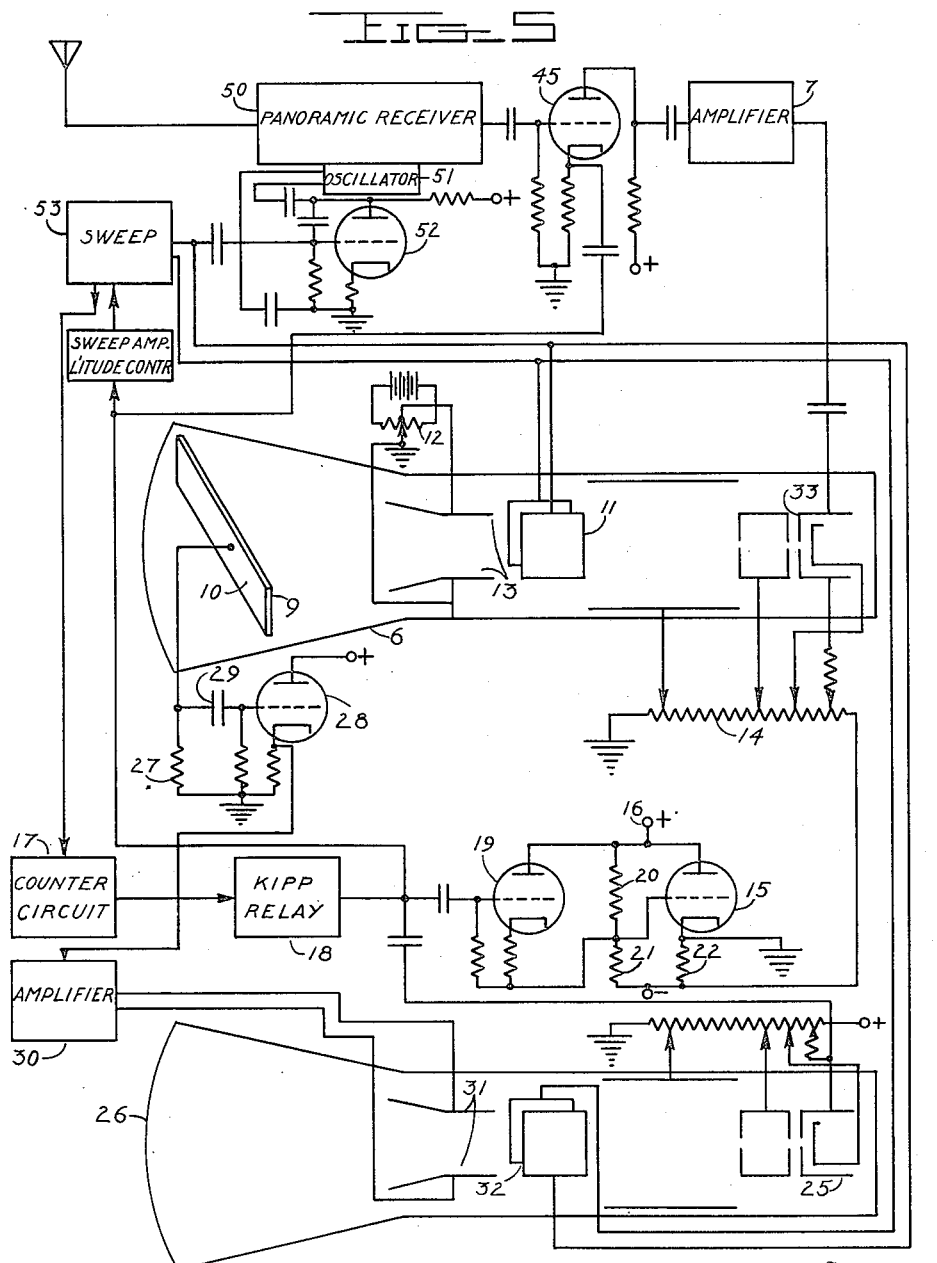

Patented May 23, 1950

2,508,408

UNITED STATES PATENT OFFICE 2,508,408

AVERAGING INDICATOR

Sidney H. Liebson, Washington, D. C.

Application October 11, 1943, Serial No. 505,836

2 Claims. (Cl. 250—20)

(Granted under the act of March 3, 1883, as amended April 30, 1928; 370 O. G. 757)

This invention relates to the improvement of signal to noise ratio in systems wherein a recurrent signal is present. In particular it is applicable to radar reception.

The system of the present invention operates with respect to a recurrent signal of some definite frequency. The signal wave form is not material. Noise is present in the signal in random distribution. The desired signal is repeated in fixed or slowly varying phase. Such conditions exist, for instance, in radar and panoramic reception.

The signal is applied to the control grid of an electron gun. The modulated beam is swept at the signal recurrence frequency across a target of the storage type. This operation is repeated a plurality of times, and the signal built up as a voltage distribution function across the target.

The target employed may be of a variety of suitable constructions, provided that it is capable of maintaining a voltage distribution and of secondary emission. A particularly convenient target is an iconoscope mosaic. Mica sheet may be used. In any case, the target is backed with a signal plate.

During the storing sweeps described the desired signal is multiplied with each sweep. The noise is applied in random distribution. Whereas cancellation of all noise is not obtained, the resultant noise voltage pattern closely approaches a constant value proportional to the number of storing sweeps, modulated with a random voltage distribution whose amplitude is of the order of that in a single sweep. Consequently the target voltage pattern may be taken off, the constant voltage discarded by a D. C. rejection component, and the desired signal, multiplied in the storage process, obtained with a greatly increased signal to noise ratio. The invention will also effectively reduce the effect of interference other than noise providing it does not enter the signal in a fixed phase relation.

Whereas the above remarks have been framed in terms of noise reduction, it is manifest that the inherent operation of the invention is to obtain the average value of a recurrent signal over a multiplicity of cycles, and is of utility wherever such result is desired.

Storing and removing the voltage distribution pattern of the target may be performed in a variety of manners. For instance, the target may be swept by a relatively low velocity beam, wherein the secondary emission ratio of the specific target material employed is well under unity. In the embodiments to be described such operation is effected by operating an electron gun under low potentials with electrostatic deflection. Higher resolution may be obtained, if necessary, by other low velocity beam generators such as those described in Proc. I. R. E., vol. 27, p. 547. The pattern is then built up as a negative charge. A take-off sweep is then run with a high velocity beam, operating in the region where the secondary emission of the target material is high. The signal take-off during such sweep is proportional to the potential shift of the area under the beam from the value of the pattern potential at the point to the positive equilibrium value due to excess secondary emission. After the beam has passed the area, its potential gradually falls by receiving low velocity secondary electrons emitted from other portions of the target. The areas receiving the low velocity storing beam at higher current during the storing sweeps become more negative than the average target potential. Alternately, the stored image may be established by repeated traces under very low beam current at moderate velocity effecting secondary emission with a ratio greater than unity, but not carrying the target to the saturation level, which is effected by the take-off trace. Under this mode of operation the target areas receiving the storing beam traces under higher current level become less negative than the average target potential which drifts negative by receiving the electrons from secondary emission under the beam. When the high velocity take-off trace is run, such areas undergo less potential shift to the positive saturation value than those receiving less storing beam current. The take-off sweep signal may then be applied to such indicator as is desired. Conveniently a cathode ray tube may be used. Such indicating tube will be scanned synchronously with the scanning sweep of the storing tube, and the signal applied as deflection from a baseline indication or as beam current modulation. Alternately, the scanning sweep may be taken at very low velocity and applied to a mechanical type recorder.

The invention will be further described with reference to the exemplary embodiments shown in the drawings, in which:

Fig. 2 shows the waveform present at selected points in the circuit of Fig. 1.

Fig. 3 is a circuit diagram of the averaging indicator employed with a mechanical recorder in a radar system.

Fig. 4 shows the waveform present at selected points in the circuit of Fig. 3.

Fig. 5 is a circuit diagram of the averaging indicator employed in a panoramic reception system.

Figure 1:
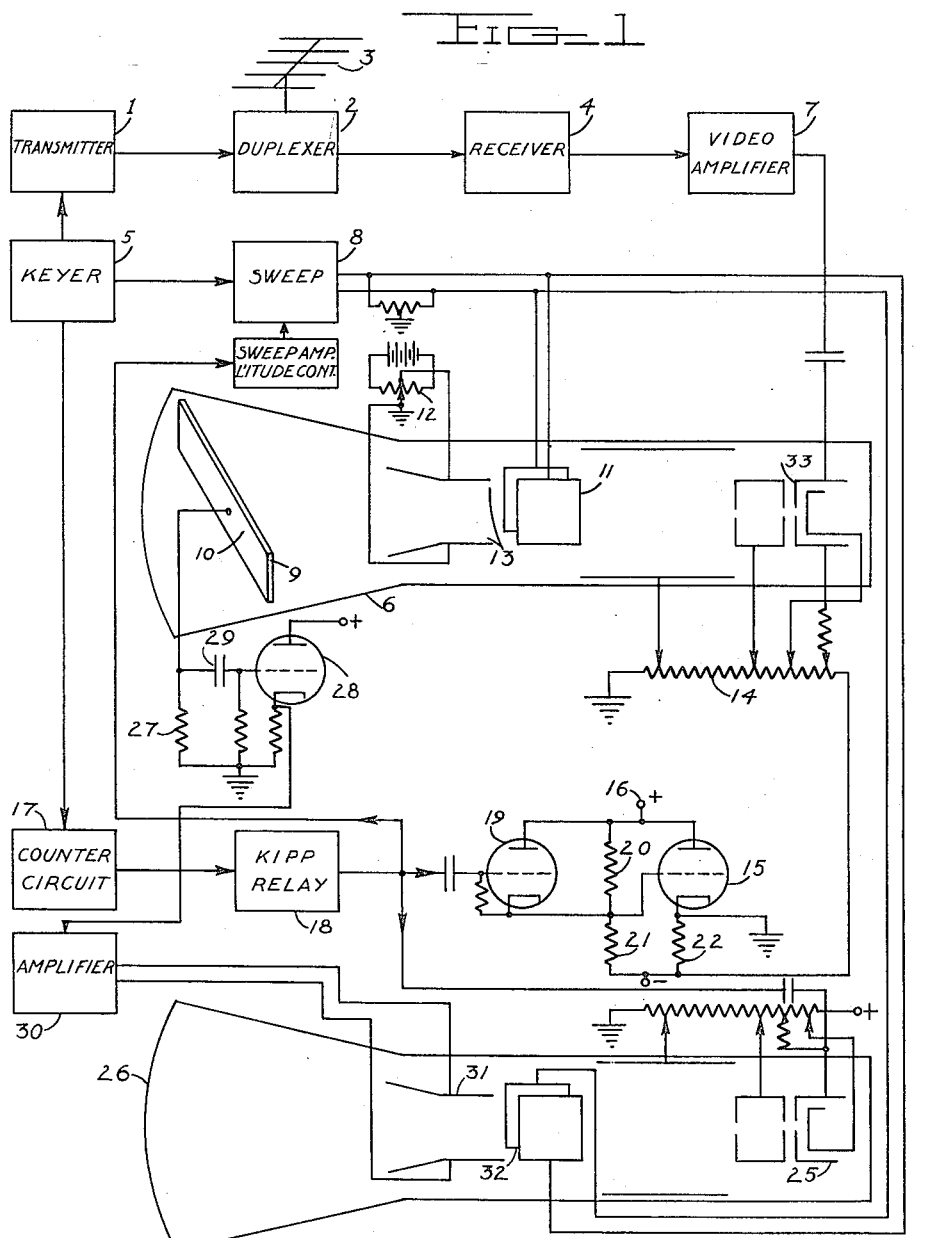
Fig. 1 is a circuit diagram of the averaging indicator in a radar system.

The radar system shown in Fig. 1 comprises a conventional transmitter 1, duplexing system 2, antenna 3 and receiver 4. Keyer 5 trips the transmitter by injection of a suitable waveform such as the square wave shown at *a* in Fig. 2. The transmitter pulses are shown at *b* in Fig. 2. The receiver feeds control grid 33 of storage tube 6 through video amplifier 7.

Sweep generator 8 is synchronized from keyer 5 and generates a rectilinear sweep of the signal modulated beam across target 9 carried by signal plate 10. For this purpose the sweep generator is connected with horizontal deflection plates 11. Adjustable source 12 is applied to vertical deflection plate 13 for effecting correct adjustment of the beam locus on target 9.

The operating voltages for storage tube 6 are applied to the respective elements from voltage divider 14. The potential applied to divider 14 is controlled by follower tube 15 connected with high voltage supply at 16.

The system so far described effects successive application of the radar signal reflections, with attendant noise, to the target 9. The voltage distribution pattern is taken off as follows.

Keyer 5 is connected with a frequency divider 17 which may conveniently be a counter circuit, as shown in Fig. 1. The output of the counter circuit is shown at *d* in Fig. 2.

The output of the frequency divider is applied to Kipp relay 18, which is of the unbalanced multivibrator type, to produce a square keying wave shown at *e* in Fig. 2.

The frequency division ratio illustrated in Fig. 2 is 5:1, and has been selected for convenience in illustration. Larger ratios may be preferred in practice. The output of the relay 18 is timed in accordance with the sweep period of the system, and for the period of a single sweep establishes the image take-off trace.

The relay output keys tube 19 with a positive pulse to shift this tube to a highly conductive condition. This in effect drives the grid of tube 15 to a higher positive level that is normally established by voltage dividers 20 and 21. The cathode resistor 22 of tube 15 then carries substantially the full potential drop equal to voltage supply 16, which is applied to divider 14 of the storage tube, and consequently produces a high beam velocity scan of the voltage pattern on target 9. The voltage supplied to divider 14 is shown at *f* in Fig. 2.

Simultaneously relay 18 increases the amplitude of sweep generator 8 to compensate for the decreased transit time of the beam in deflection plates 11. This may be accomplished by increasing a supply voltage of the sweep generator or its associated amplifier components by the means shown for storage tube 6. The waveform of the sweep generator output is shown at *c* in Fig. 2.

The output of relay 18 is also applied to control grid 25 of indicator tube 26 for unblocking this tube for receiving the take-off trace signal. Said signal is developed across resistor 27 which is coupled to the grid of cathode follower 28 through condenser 29 to eliminate the direct current component.

The output from the coupling stage is fed through amplifier 30 to the vertical deflection plates 31 of the indicating tube. Horizontal deflection plates 32 receive the sweep signal from generator 8 in synchronism with the take-off trace of storage tube.

It should be noted that the receiver signal is fed to grid 33 of storage tube 6 during the take-off trace. This is not objectionable where the scanning trace is of the same frequency as the signal recurrence frequency.

During the storage traces, some signal may be present in amplifier 30. Such signal, having a low signal to noise ratio, does not appear on indicator tube 26 because said tube is blocked except during operation of relay 18.

The averaging indicator system shown in Fig. 3 includes a low frequency take-off sweep which is applied to a mechanical recorder. In order to effect this, high and low frequency generators are employed. The Kipp relay is characterized in that its output is a multiple of the signal recurrence frequency, as will be understood by reference to Fig. 4, where its output is shown at *f*. The keyer waveform is shown at *a* in Fig. 4, the transmitter at *b*, the high frequency sweep at *c*, the low frequency sweep at *d*, and the frequency divider at *e*.

For the purposes of illustration, the relay output is shown as twice the signal period. This operates to shift the excitation of horizontal deflection plates 11 from normal high frequency sweep 40 to low frequency sweep 41 by action of electronic switch 42. Consequently the take-off scanning stroke is carried out at low speed, and the signal from follower 28 is applied through amplifier 30 to recorder 43 which is thrown into operation by the output of relay 18 operating (for instance) on a magnetic clutch 44.

From Fig. 4 it will be understood that the amplitude of sweep 41 is greater than that of sweep 40 to compensate for the increased anode voltages established on storage tube 6 during this period. The sweep voltages are shown at *g* in Fig. 2, and the storage tube divider voltage at *h*.

High frequency sweep 40 is synchronized by keyer 5 at the same frequency as the keyer, while low frequency sweep 41 is synchronized at a submultiple of the keying frequency.

In this system the receiver signal during the take-off period is not synchronized with the take-off signal, and consequently the receiver output is blanked by application of the relay output to the cathode of coupling tube 45 in the receiving system. This drives the tube to cut-off and prevents interference with the take-off signal by establishing a constant beam current.

The system shown in Fig. 5 is for the purpose of monitoring a portion of the R. F. spectrum and includes panoramic receiver 50 having oscillator 51 and reactance tube 52 controlled by sweep generator 53. Receiver 50 feeds grid 33 of storage tube 6 through amplifier 7.

Generator 53 establishes the signal recurrence frequency of the system as does keyer 5 of the previous systems. Its output is also directly applied to the horizontal deflection plates 11 and 32 of the storage and indicator tubes 6 and 26 respectively.

As in the other systems, the voltage distribution pattern is built upon target face 9 during the storage sweeps. Upon operation of counter circuit 17, Kipp relay 18 generates a positive pulse of the period of a single trace and establishes take-off voltages on storage tube elements, raises the sweep generator output, and unblocks grid 25 of indicator tube 26. Receiver output is blocked by application of the relay output to the cathode of tube 45 in the receiver system. Consequently the take-off signal is applied to the vertical deflection plates 31 of indicator tube 26 through coupling tube 28 and amplifier 30.

The invention described herein may be manufactured and used by or for the Government of the United States of America for governmental purposes without the payment of any royalties thereon or therefor.

I claim:

1. In a device for averaging recurrent signals including a desired component and noise components, a recurrent voltage signal channel, an electron beam forming gun having a cathode, a control grid, and anode electrodes, a charge storing target for receiving the beam, means coupling the grid to the signal channel, gun voltage supply means feeding the gun electrodes operative to establish an electron beam of low velocity for recording a signal on the target, sweep means synchronized with the recurrent signal operative to sweep the beam repetitively over a recording locus, beam control means recurrently operative, after quiescent periods equalling a predetermined plurality of sweep periods, to increase the gun supply voltage to provide an erasing beam velocity during the period of an integral number of sweep cycles and operative to sweep the entire recording locus during the latter period, and indicator means responsive to the target potential shift under the high velocity beam.

2. The system defined in claim 1 further including second sweep means operative during the integral number of sweep cycles of the first recited sweep means to effect a slow single sweep of the erasing beam over the recording locus.

SIDNEY H. LIEBSON.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,191,565 | Henroteau | Feb. 27, 1940 |
| 2,219,021 | Riesz | Oct. 22, 1940 |
| 2,412,669 | Bedford | Dec. 17, 1946 |
| 2,422,135 | Sanders | June 10, 1947 |
| 2,430,038 | Wertz | Nov. 4, 1947 |